United States Patent [19]

Wolf et al.

[11] Patent Number: 4,507,911
[45] Date of Patent: Apr. 2, 1985

[54] APPARATUS FOR HARVESTING AND SEPARATION OF PRODUCE

[75] Inventors: Isaac Wolf, Herzlia; Yekutiel Alper, Rishon Le Zion, both of Israel

[73] Assignee: State of Israel, Ministry of Agriculture, Beit Dagan, Israel

[21] Appl. No.: 417,610

[22] Filed: Sep. 13, 1982

[30] Foreign Application Priority Data

Sep. 14, 1981 [IL] Israel ........................................ 63818

[51] Int. Cl.³ ............................................ A01D 46/00
[52] U.S. Cl. ................................... 56/327 R; 56/16.5; 56/330
[58] Field of Search ................... 56/16.5, 104, 105, 33, 56/327 R, 330, 328 R, 14.1, 14.2; 130/30 R, 30 C, 30 B, 30 G, 30 D

[56] References Cited

U.S. PATENT DOCUMENTS

| 362,385 | 5/1887 | Kauffman | 130/30 R |
|---|---|---|---|
| 2,550,129 | 4/1951 | Urschel | 130/30 R |
| 2,656,667 | 10/1953 | Smith et al. | 130/30 R |
| 2,834,173 | 5/1958 | Wilson | 56/33 |
| 3,511,038 | 5/1970 | Gates et al. | 56/DIG. 1 |
| 3,858,660 | 1/1975 | Wadsworth | 56/327 R |
| 4,257,217 | 3/1981 | McClendon | 56/327 R |
| 4,278,097 | 7/1981 | Anderson et al. | 56/105 |
| 4,340,070 | 7/1982 | Keitel | 56/105 |

FOREIGN PATENT DOCUMENTS 898996  1/1982  U.S.S.R. ........................ 130/20

Primary Examiner—Gene Mancene
Assistant Examiner—John G. Weiss
Attorney, Agent, or Firm—Cushman, Darby & Cushman

[57] ABSTRACT

Harvesting apparatus for produce such as paprika comprising a chassis, a pick-up and primary separation assembly mounted on the chassis and including first and second helical elements, each including an elongate helical portion and a tip portion, and side conveyors for raising separated produce; and separation means including rollers for grasping at least a portion of a plant and adjacent rotating apparatus for engaging the produce thereon for separation thereof from the plant.

14 Claims, 11 Drawing Figures

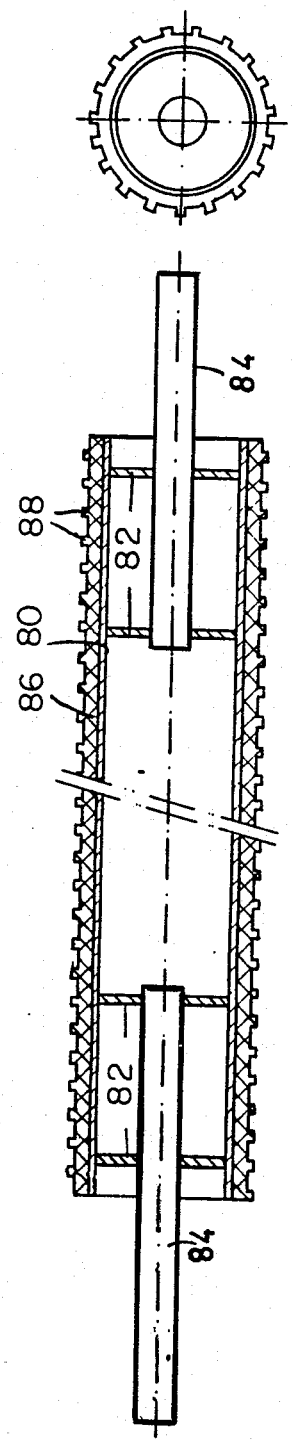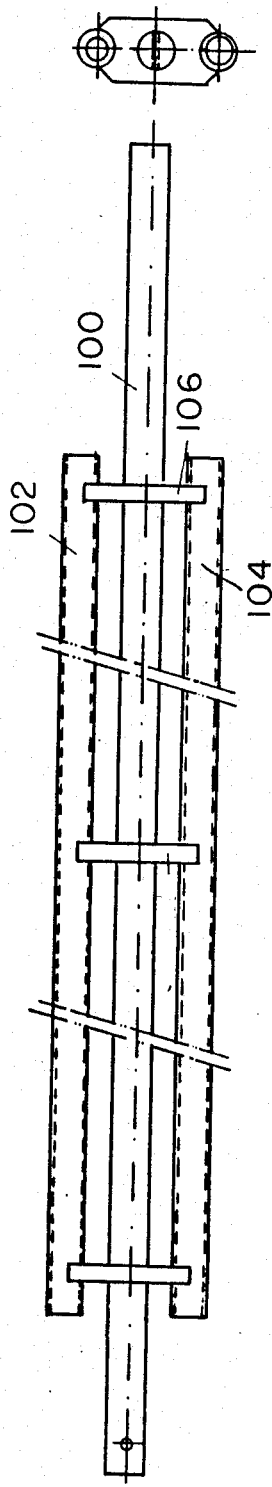

4,507,911

APPARATUS FOR HARVESTING AND SEPARATION OF PRODUCE

FIELD OF THE INVENTION

The present invention relates to agricultural equipment generally, and more particularly to produce harvesting and separation apparatus.

BACKGROUND OF THE INVENTION

Various types of harvesting apparatus are known for different types of produce. The present invention relates to apparatus for harvesting and/or separating produce which is not susceptible to damage due to squeezing, such as paprika and leaf spices. A well known problem in the harvesting of this type of produce is in separating the produce from the vine.

Various mechanical solutions have been proposed for havesting paprika and similar crops, but none have met with commercial success due, at least in part, to their failure to achieve satisfactory separation of the produce from the remainder of the plant.

SUMMARY OF THE INVENTION

The present invention seeks to provide apparatus for harvesting produce such as paprika or leaf herbs and separating the produce from the remainder of the plant.

There is thus provided in accordance with an embodiment of the present invention harvesting apparatus for produce such as paprika or leaf herbs comprising a chassis, a pickup and primary separation assembly including first and second helical elements, each including an elongate helical portion and a tip portions, and side conveyors for raising separated produce; separation apparatus including rollers for grasping at least a portion of a plant and adjacent rotating apparatus for engaging the produce thereon for separation thereof from the plant portion.

Further in accordance with an embodiment of the present invention, the harvesting apparatus also comprises cleaning apparatus comprising a plurality of starwheel type fingers arranged in interdigitated orientation to define a cleaning conveyor bed along which produce is passed.

Additionally in accordance with an embodiment of the present invention, the tip portion of the helical element comprises a helix of increasing radius. Further in accordance with an embodiment of the present invention, the elongate portion of the helical element comprises a double helix of increasing radius at a first portion and uniform radius along a second portion.

Further in accordance with an embodiment of the invention, the first helical element comprises a left-handed rotation double helix while the second helical element comprises a right-handed rotation double helix. Additionally, in accordance with the invention, the first and second helical elements are maintained in a 90 degrees out of phase orientation thereby enabling them to be oriented close to each other without involving contact therebetween.

In accordance with a preferred embodiment of the present invention, the first and second helical elements rotate in opposite directions at a speed of approximately 1000 r.p.m. Further in accordance with a preferred embodiment of the present invention, two pairs of first and second helical elements are provided, each for engagement with a row of growing produce.

The function of the helical elements is to additionally denude the growing plant of all of its produce but without, necessarily, uprooting the plant. Since the denuding operation in practice involves breakage of portions of the plant attached to the produce, additional separation apparatus is provided for separating the produce from those plant parts.

Additionally in accordance with an embodiment of the present invention there is provided separation apparatus comprising at least first and second engaging roller means, the first engaging roller means arranged for initially grasping produce bearing plant portions therebetween and the second engaging roller means arranged for engaging produce attached to the plant while it is engaged by the first engaging roller means, the second engaging roller means having a higher surface rotation velocity than the first engaging roller means.

According to a preferred embodiment of the invention the engaging roller means comprises a pair of rollers configured for squeezing engagement of a plant therebetween. Alternatively, the engaging roller means comprises more than two rollers. As a further alternative, the engaging roller means may comprise a single roller and a stationary platen.

Further in accordance with an embodiment of the invention, there are also provided additional engaging roller means each being arranged for engagement of produce attached to a plant which is grasped by at least one preceding engaging roller means, each successive engaging roller means having a higher surface velocity than the preceding roller engaging the plant at the same time.

According to a preferred embodiment of the invention, four such engaging roller means are provided.

BRIEF DESCRIPTION OF THE DRAWINGS

The present invention will be more fully understood and appreciated from the following detailed description taken in conjunction with the drawings in which:

FIG. 10 is an illustration of a squeeze roller employed in the embodiment of FIG. 5; and FIG. 10A is a cross-sectional view of FIG. 10;

FIG. 11 is an illustration of a rotating bar assembly also employed in the embodiment of FIG. 5.

FIG. 11A is a cross-sectional view of FIG. 11.

DETAILED DESCRIPTION OF A PREFERRED EMBODIMENT

Figure 1:
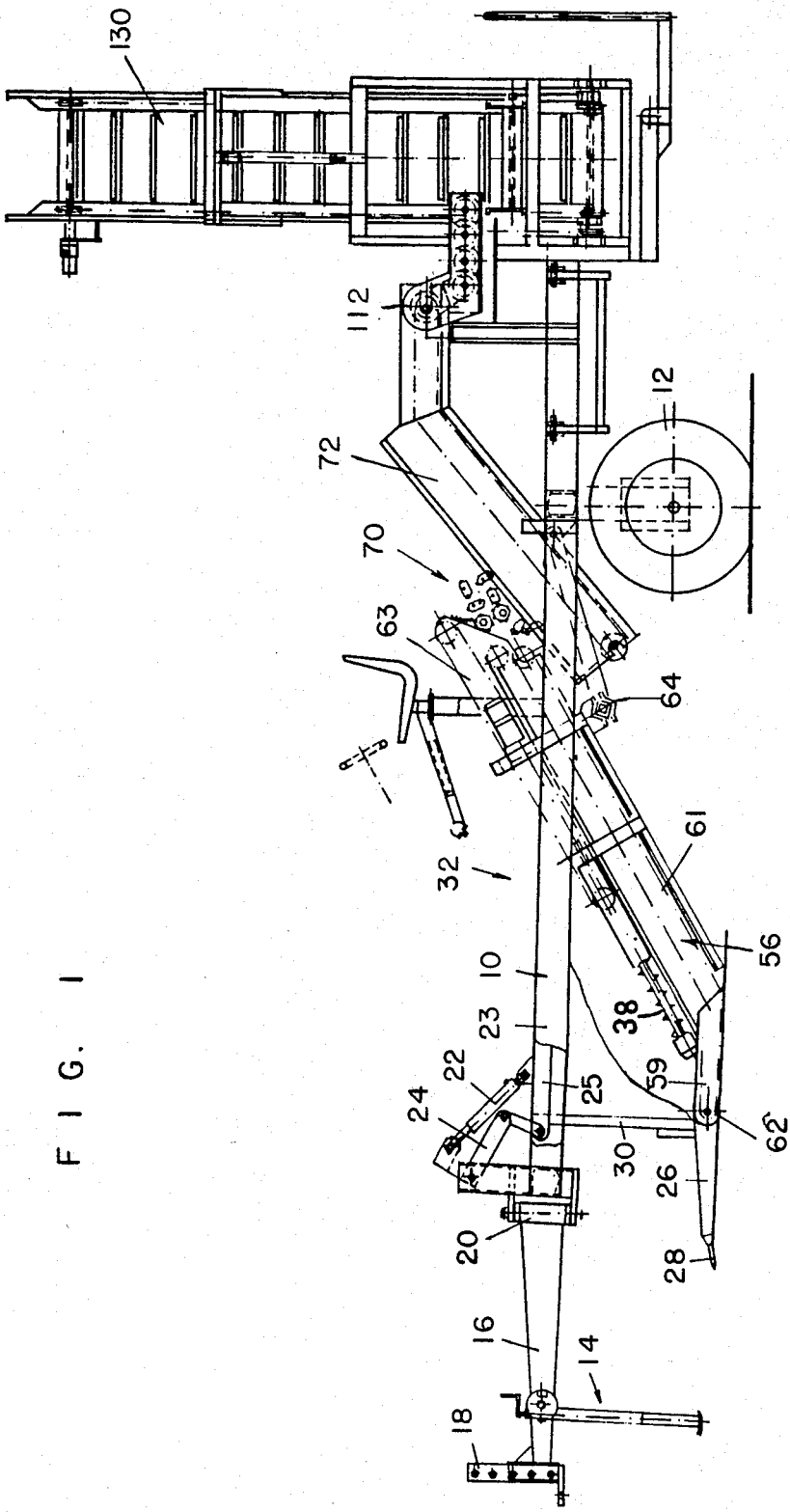
FIG. 1 is a side view schematic illustration of harvesting apparatus constructed and operative in accordance with an embodiment of the present invention.
Figure 2:
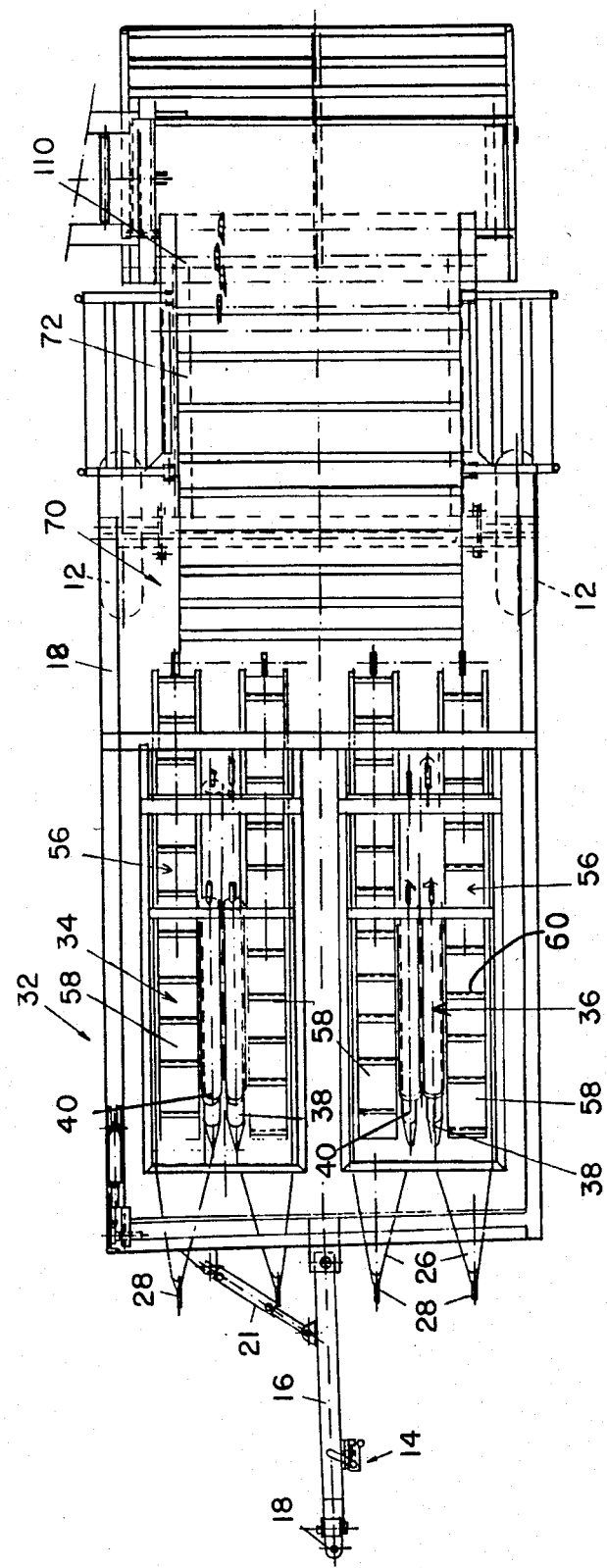
FIG. 2 is a top view schematic illustration of the harvesting apparatus of FIG. 1.

Reference is now made to FIGS. 1 and 2 which illustrate harvesting apparatus constructed and operative in accordance with an embodiment of the present invention and comprising a chassis 10 mounted on a pair of wheels 12. Chassis 10 is designed to be towed by a tractor or other suitable motive device. Alternatively, a self-propelled chassis may be provided.

Mounted at the front of the chassis 10 is a retractable stand assembly 14 which is in turn associated with a tow bar 16, having a tow connector 18 formed at the front thereof. The rear of tow bar 16 is pivotably connected to the front of chassis 10 for rotation about a vertical axis 20. A piston and cylinder assembly 21 determines the orientation of chassis 10 about axis 20 for precise positioning of the chassis. Chassis 10 comprises an outer portion 23, as well an an inner portion 25 on to which is mounted a pick-up and primary separation assembly 32. The height of the inner chassis 25 with respect to the tow bar 16 is determined by a fluid operated piston and cylinder assembly 22 which is associated with an articulated mounting assembly 24. The height of the front of the inner chassis 25 about a furrow is determined by a plurality of skids 26, each having a pointed front 28 and a curved surface which extend generally horizontally and lie on the soil bed. Skids 26 are connected by means of a generally vertical rod 30 to articulated mounting assembly 24 for governing the height of the inner chassis 25 which respect to the soil bed.

Pick-up and primary separation assembly 32 comprises two parallel and substantially identical pick-up and primary separation sub-assemblies, 34 and 36. Each sub-assembly is arranged to engage and harvest one row of produce, such as paprika. Associated with each sub-assembly are a pair of skids 26 which function as guides, to direct the growing plants into engagement with the sub-assemblies.

Figure 3:
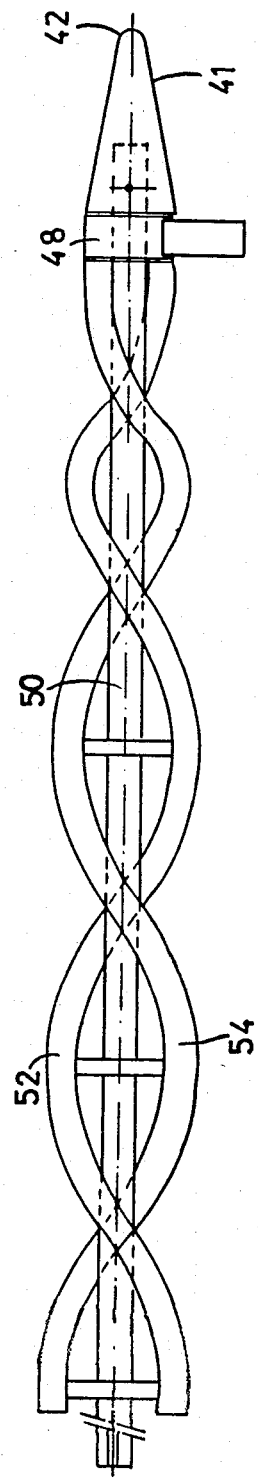
FIG. 3 is a detailed illustration of a helical element used in the invention.
Figure 4:
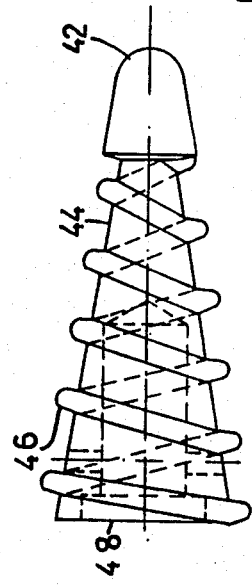
FIG. 4 is a detailed illustration of tip portion of a helical element.

Each assemblies 34 and 36 comprises a pair of helical elements 38 and 40. These helical elements are illustrated in detail in FIGS. 3 and 4 to which reference is additionally made. Each helical element comprises a tip portion, shown in FIG. 4, which includes a rounded tip 42, a conical center element 44 and a single helix of overall conical configuration 46 which extends from the tip 42 at a narrow radius, rearwardly to its maximum radius. Disposed rearwardly of tip portion 41 there is defined a first bearing mount 48 for the helical element.

Rearward of bearing mount 48 there is defined a central elongate rod 50 about which is wound a double helix including helical elements 52 and 54. Adjacent bearing mount 48, helical elements 52 and 54 define an overall conical configuration of increasing radius and thereafter define a double helix of uniform radius. The particular construction of helical elements 38 and 40 and especially the tip portions 41 thereof is a particular feature of the present invention since it provides enhanced engagement with the growing plants, for grasping produce in the intertices between the helical elements and separating it from the plants. The tip portions having the helical configuration are particularly useful for drawing the plants into engagement with the remainder of the helical elements.

According to a preferred embodiment of the invention, the two helical elements 38 and 40 in each sub-assembly rotate in respective opposite directions and such that at their common boundary, their tangential velocity is directed upwardly and at their separate outer side boundaries, their tangential velocity is directed downward. Disposed adjacent each of the helical elements alongside their outward side boundaries there is provided an inclined side conveyor 56 configured to have compartments 58 defined by transverse upstanding members 60, in order to prevent produce from sliding thereon towards the lower end of the conveyor. Side conveyors 56 are powdered by conventional hydraulic motors (not shown) and are supported, inter alia, on support rollers 62 and 64. Side conveyors 56 are arranged to receive produce separated from plants by means of the action of the helical elements and which are thrown onto the side conveyors due to the rotation of the helical elements.

It is a particular feature of the invention that side conveyors 56 are formed with a generally horizontal portion 59 which extends slightly in front of the corresponding tip portion 41 of each helical element and elongate inclined portion 61 which extends generally parallel to, below and to the side of each helical element. In order to assist in the operation of side conveyors 56 there is provided in association with each such side conveyor a moving chain 63 which lies above the upper portion of the side conveyor surface and moves together therewith, thereby assisting in raising produce, particularly when it is still joined to parts of plants.

Figure 5:
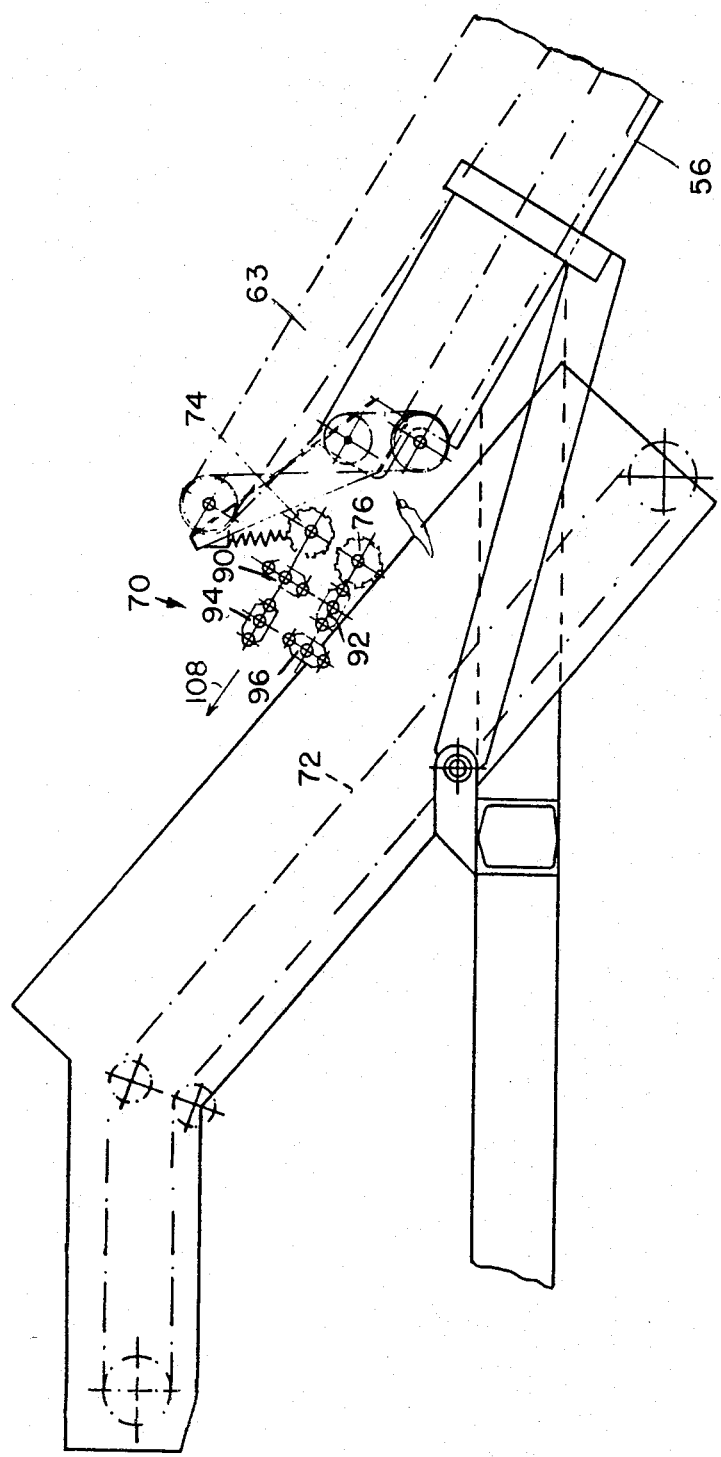
FIG. 5 is a detailed schematic illustration of separation apparatus constructed and operative in accordance with one embodiment of the present invention.

Produce and plants raised by the pick-up and primary separation assembly 32 are supplied to separation apparatus 70, which is illustrated in detail in FIG. 5. Produce which has already been separated from plants is allowed to drop from the side conveyors 56 onto a loading conveyor 72 without engaging the separation apparatus. All other plant material and produce attached thereto engages a first pair of squeeze rollers 74 and 76, which strongly grasp the plants.

An individual squeeze roller is illustrated in section in FIG. 10 and comprises a cylindrical base 80 which is mounted by transverse interior members 82 onto a pair of axles 84. Formed over base 80 is a layer of a resilient material 86, typically rubber, which comprises a multiplicity of protruding stubs 88 which are evenly distributed on the surface of layer 86. It is appreciated that the layer 86 with associated integrally formed protruding stubs 88 may be defined by a flat web of such material which is attached to the base 80. Alternatively layer 86 may be moulded directly onto base 80.

The particular configuration of layer 86 is designed to provide enhanced grasping of a plant which is held between the two squeeze rollers 74 and 76 due to engagement of the plant by the stubs 88.

Disposed downstream of the squeeze rollers 74 and 76 there are provided two pairs of rotating bar assemblies, identified as bar assemblies 90, 92, 94 and 96. An individual rotating bar assembly is illustrated in FIG. 11 and comprises a central axle 100, which defines the rotational axis of the assembly, and a pair of side bars 102 and 104 which are attached to the central axle by means of transverse mounting elements 106. It may be appreciated that between the side bars 102 and 104 and the central axle 100 there are defined interstices through which plant portions and produce may extend, while the plant is secured by squeeze rollers 74 and 76. Rotation of assemblies 90, 92, 94 and 96 provides a "combing" action against the plant and results in removal of produce, such as paprika, from the plants.

It is noted with reference to FIG. 5 that assemblies 90 and 92 are maintained in a 90 degree out of phase relationship as are assemblies 94 and 96. The elements of assembly pairs 90 and 92, on the one hand and 94 and 96 on the other hand both rotate in respective opposite directions and in a sense such that they rotate in the direction of plant motion through the separation apparatus between elements of the assembly pairs. It is appreciated that the rotational speed assemblies 90-96 is normally faster than that of squeeze rollers 74 and 76 which also rotate in mutually opposite directions so as to drive plants rearwardly therethrough in a direction indicated by arrow 108.

The rotational speed of assemblies 90-96 is typically about 1000 r.p.m. while the rotational speed of squeeze rollers 74 and 76 is approximately 100 r.p.m.

Figure 7:
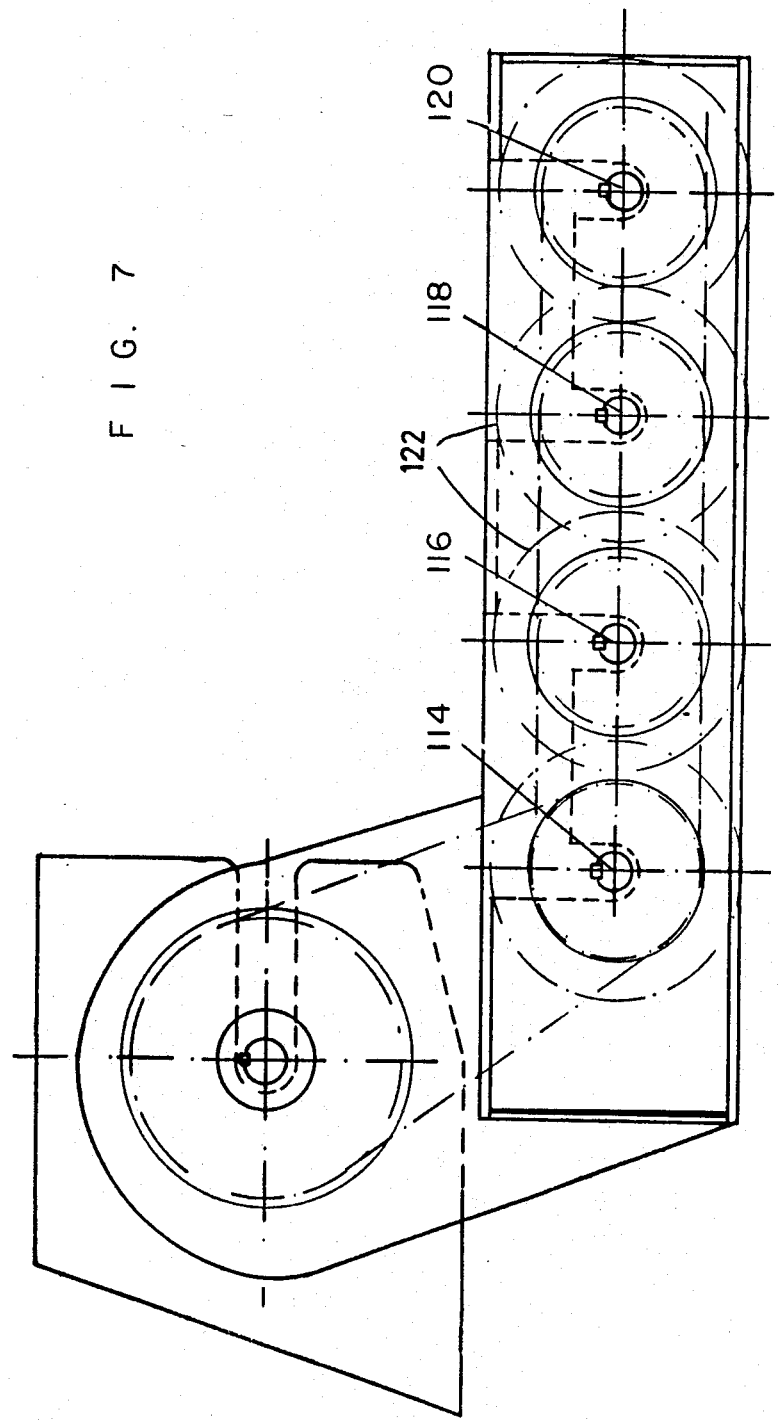
FIG. 7 is a detailed side view illustration of cleaning apparatus constructed and operative in accordance with an embodiment of the present invention.

The plants and separated produce fall from the separation apparatus 70 onto a conveyor belt 72 which raises them and supplies them to cleaning apparatus 112. Cleaning apparatus 112 is illustrated in respective side and top views in FIGS. 7 and 8 and defines a sorting bed on which the produce and plants lie and are manually separated by workers located adjacent thereto.

Figure 8:
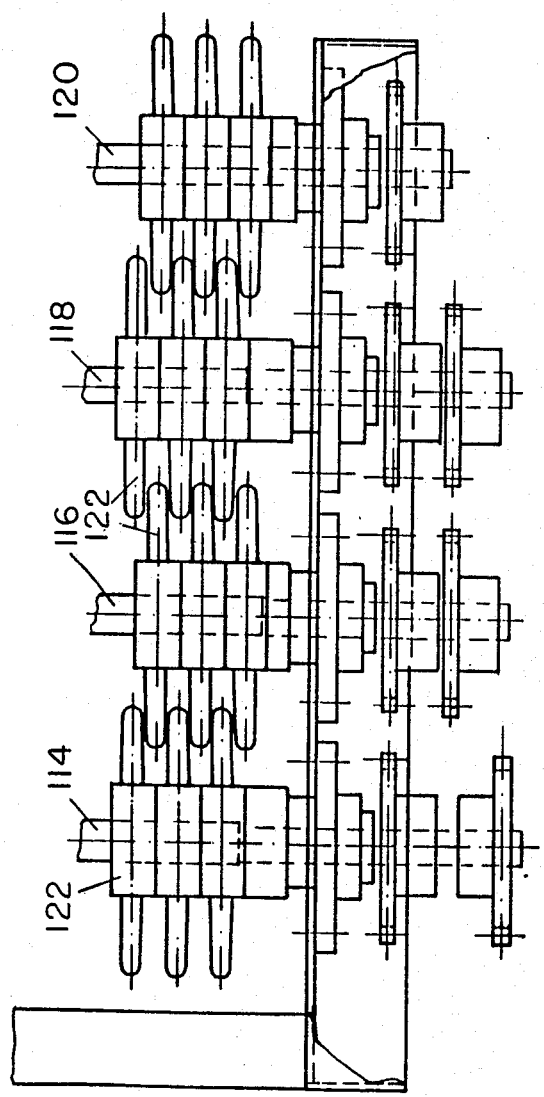
FIG. 8 is a detailed top view illustration of the apparatus of FIG. 7.
Figure 9:
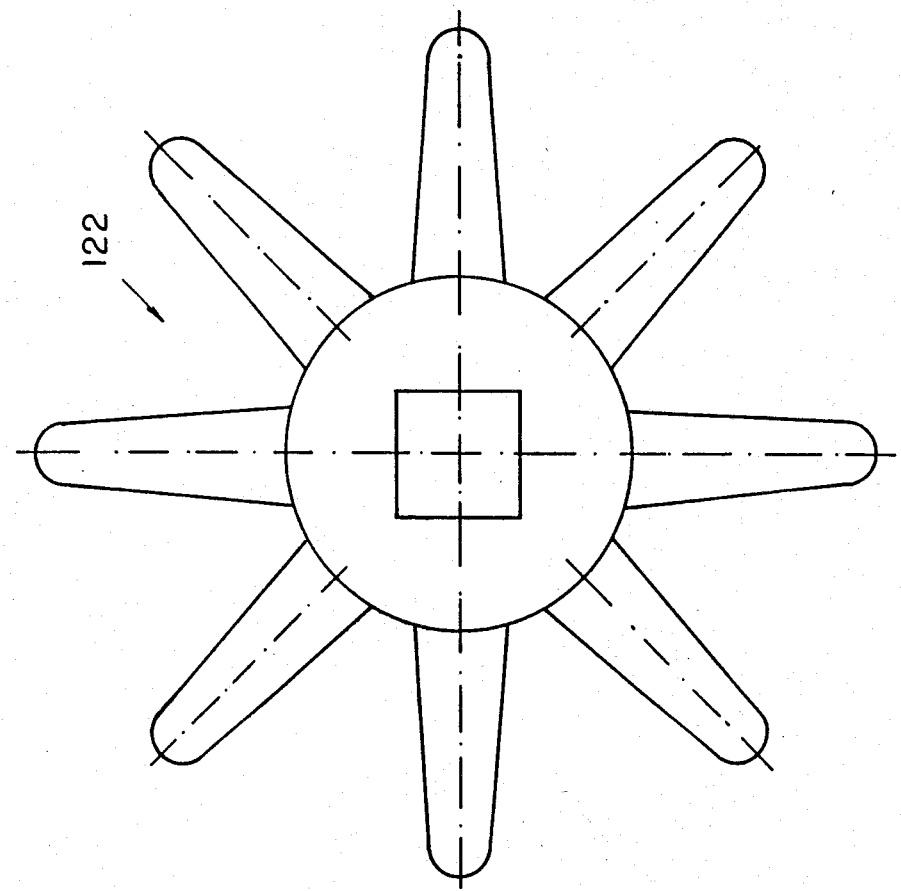
FIG. 9 is an illustration of a star-wheel roller element used in the apparatus of FIGS. 7 and 8.
Figure 9A:
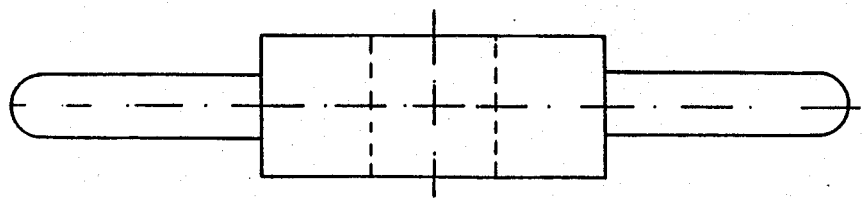

Cleaning apparatus 112 comprises a plurality of rotated axles 114, 116, 118 and 120 onto which are mounted a stack of rubber star wheel shaped elements 122, as seen in FIG. 9. Elements 122 are arranged in out of phase interdigitated relationship as seen in FIG. 8 and are designed to permit small spurious particles to fall therethrough as produce passes therealong. All of the individual axles and elements 112 rotate in the same direction for providing a forward conveying action.

From cleaning apparatus, the produce, which remains thereon is provided to an adjustably angled feed conveyor 130 for transport to a container (not shown) for storage and transport. The plant portions such as branches from which the produce has been removed, are discarded by the workers from cleaning apparatus 112.

Figure 6:
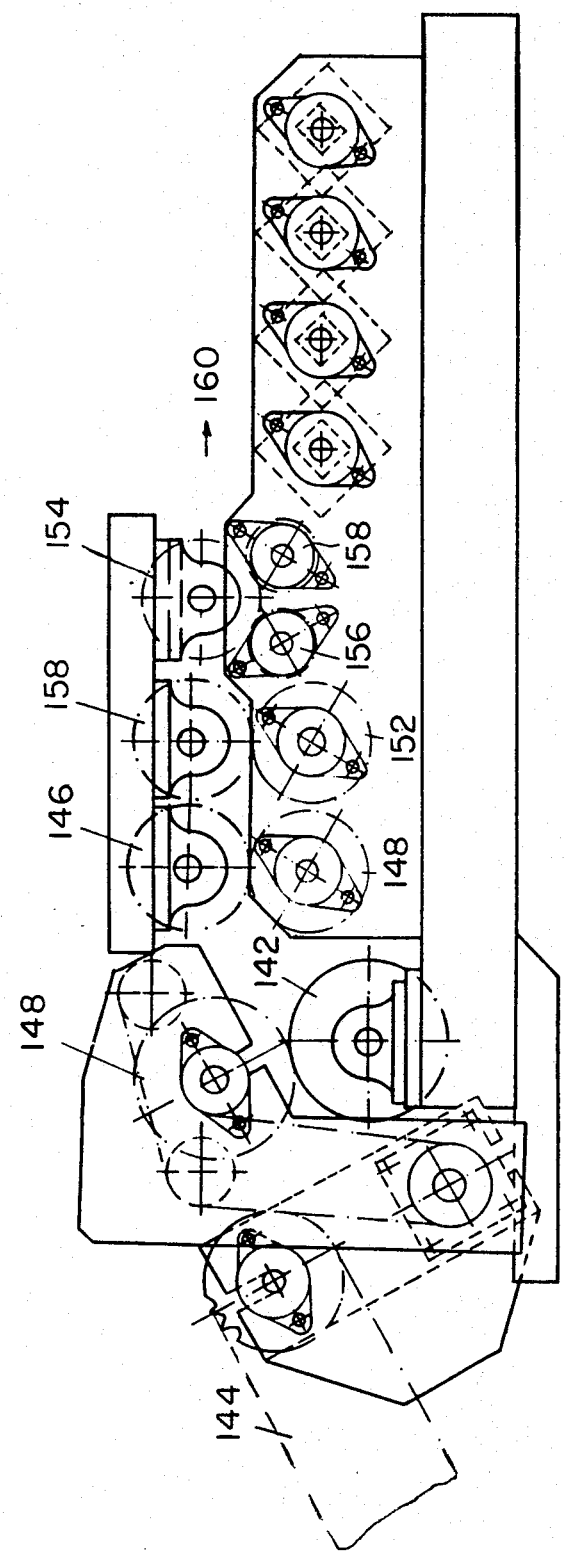
FIG. 6 is a detailed schematic illustration of separation apparatus constructed and operative in accordance with an alternative embodiment of the invention.

Reference is now made to FIG. 6 which illustrates separation apparatus which may be employed as an alternative to the separation apparatus 70 illustrated in FIG. 5. The separation apparatus of FIG. 6 may also have additional applications, such as for separating spice leaves from plants or other types of separation.

The separation apparatus of FIG. 6 comprises a first pair of squeeze rollers 140 and 142 which initially grasp plants supplied by a conveyor 144. An additional two pairs of squeeze rollers 146, 148 and 150, 152 are positioned downstream of squeeze rollers 140 and 142. A third squeeze roller 154 is associated with a pair of support rollers 156 and 158. According to a preferred embodiment of the invention, each of the elements of the engaging roller means rotates in an opposite direction and such that produce and plants are drawn in between the rollers in a direction indicated by an arrow 160. Further in accordance with a preferred embodiment of the present invention, the surface rotation speed of each of the successive pairs of squeeze rollers increases. Thus the surface rotation speed of squeeze rollers 146 and 148 is greater than that of squeeze rollers 140 and 142. The surface rotation speed of squeeze rollers 150 and 152 is greater than the surface rotation speed of rollers 146 and 148 and so on, for as many pairs or assemblies of squeeze rollers as are provided.

The above-described arrangement of successively increasing surface rotation speeds of squeeze rollers provides a combing action which separates produce such as paprika, or leaves from a plant which is grasped by a slower moving squeeze roller.

It will be appreciated by persons skilled in the art that the invention is not limited to what has been particularly shown and described hereinabove. Rather the scope of the present invention is defined only by the claims which follow:

We claim:

1. Harvesting apparatus for produce comprising:
    a chassis;
    a pick-up and primary separation assembly mounted on said chassis and including first and second helical elements between which plants will pass, each first and second elements including an elongate helical portion and a tip portion;
    side conveyors for raising produce separated by said pick-up and primary separation assembly; and
    separation means including rollers for grasping at least a portion of a plant raised by said pick-up and primary separation assembly and adjacent rotating apparatus for engaging the produce thereon for separation thereof from the plant,
    said rotating apparatus comprising first and second pairs of rotating bar assemblies, each of said rotating bar assemblies comprising an axle defining a rotational axis, first and second elongate side bars arranged in spaced orientation along a transverse axis perpendicular to said rotational axis,
    one of the rotating bar assemblies in each of said first and second pairs being arranged for 90° out of rotational phase relative to the second rotating bar assembly;
    each of said first and second pairs of rotating bar assemblies being arranged to receive between the bar assemblies of the pair at least a portion of the plant for engaging the produce thereon.

2. Harvesting apparatus according to claim 1 and also comprising:
    cleaning apparatus for cleaning the produce from the said separation means, and side conveyors, said cleaning apparatus including a plurality of star-wheel type elements arranged in interdigitated orientation to define a separating conveyor bed along which produce is passed.

3. Harvesting apparatus according to claim 1 and wherein said elongate portion of each said helical elements comprises a double helix of increasing radius at a first portion of the length thereof and a uniform radius along a second portion thereof; and wherein said tip portion of each of said helical elements comprises a single helix of increasing radius.

4. Harvesting apparatus according to claim 1 and wherein said first and second helical elements rotate in opposite directions.

5. Harvesting apparatus according to claim 1 and wherein said pick-up and primary separation assembly comprises two pairs of first and second helical elements, each pair being arranged for engagement with a row of produce to be harvested.

6. Harvesting apparatus according to claim 1 and wherein said rotating bar assemblies have a higher surface rotational velocity than said rollers of said separation means.

7. Harvesting apparatus according to claim 1 and wherein said first and second helical elements comprise respective left hand and right hand helixes.

8. Harvesting apparatus according to claim 1 and wherein said side conveyors each comprises a generally horizontal front portion and an upwardly inclined rear portion.

9. Harvesting apparatus according to claim 9 and wherein said front portion of each of said side conveyors extends in front of the tip portion of said helical element.

10. Harvesting apparatus according to claim 1 and wherein said rollers are provided with a multiplicity of protruding stubs evenly distributed thereon and formed of a resilient material.

11. Separating apparatus for separating produce from plants and comprising:

at least first and second roller means, said first roller means being arranged for initially grasping produce bearing plants therebetween and said second roller means being arranged for engaging produce attached to said plant while it is engaged by said first roller means, said second roller means having a higher surface rotation velocity than said first roller means, said second roller means comprising first and second pairs of rotating bar aseemblies, each of said rotating bar assemblies comprising an axle defining a rotational axis, first and second elongate side bars arranged in spaced orientation along a transverse axis perpendicular to said rotational axis, one the rotating bar assemblies in each of said first and second pairs being arranged for 90° out of phase rotation relative to the second rotating bar assembly;

each of said first and second pairs of rotating bar assemblies being arranged to receive between the bar assemblies of the pair at least a portion of the plant for engaging the produce thereon.

12. Apparatus according to claim 11 and wherein said first roller means comprises a pair of rollers which are provided with a multiplicity of protruding stubs evenly distributed thereon and formed of a resilient material.

13. Apparatus according to claim 6 or 11 and also comprising additional roller means, each being arranged for engagement of produce attached to a plant which is grasped by at least one preceding roller means, each successive roller means having a higher surface velocity than the preceding roller which engages the plant at the same time.

14. Apparatus according to claim 6 or 11 and comprising four roller means, each having a higher surface speed than the preceding roller.

* * * * *